United States Patent [19]

Rosky et al.

[11] Patent Number: 4,590,914

[45] Date of Patent: May 27, 1986

[54] METHOD FOR INCREASING FUEL EFFICIENCY

[75] Inventors: Leon Rosky, Flint; Gabriel T. Anslow; Daniel F. Spaniola, both of Swartz Creek; Marvin H. Weintraub, West Bloomfield, all of Mich.

[73] Assignee: Optimizer, Limited, Flushing, Mich.

[21] Appl. No.: 619,586

[22] Filed: Jun. 11, 1984

[51] Int. Cl.$^4$ .................................... F02M 31/00
[52] U.S. Cl. .................................... 123/557; 123/3
[58] Field of Search ............... 123/3, 557, 549; 44/50, 44/68, 67

[56] References Cited

U.S. PATENT DOCUMENTS

| | | | |
|---|---|---|---|
| 1,777,554 | 10/1930 | Ducloux | 123/3 |
| 1,950,806 | 3/1934 | Mathes | 123/557 |
| 3,653,364 | 4/1972 | Bogan | 123/536 |
| 4,103,658 | 8/1978 | Bernecker | 123/524 |
| 4,267,976 | 5/1981 | Chatwin | 123/538 |
| 4,312,317 | 1/1982 | Jewett | 123/557 |
| 4,452,215 | 6/1984 | Glass | 123/557 |
| 4,507,516 | 3/1985 | Hiroaka | 585/14 |

Primary Examiner—Ronald H. Lazarus
Attorney, Agent, or Firm—Basile Weintraub Hanlon

[57] ABSTRACT

By contacting a combustible fluid fuels with a metallic medium, such as metallized pellets, the fuel efficiency of the fuel can be increased. The metallic medium is maintained at a temperature sufficiently low so as to not alter the fluid phase of the fuel, e.g. if liquid, it remains liquid. The metallic medium is, preferably, a noble metal, such as platinum.

9 Claims, 3 Drawing Figures

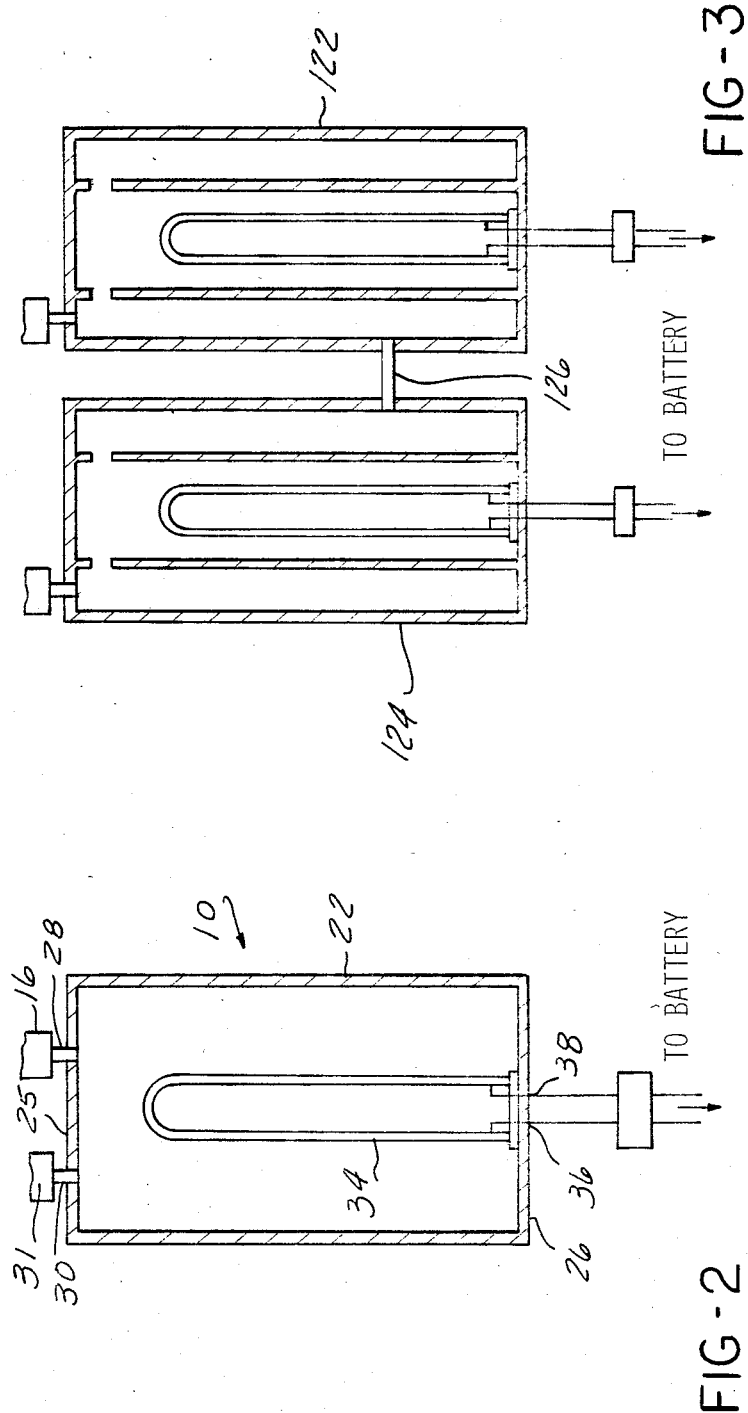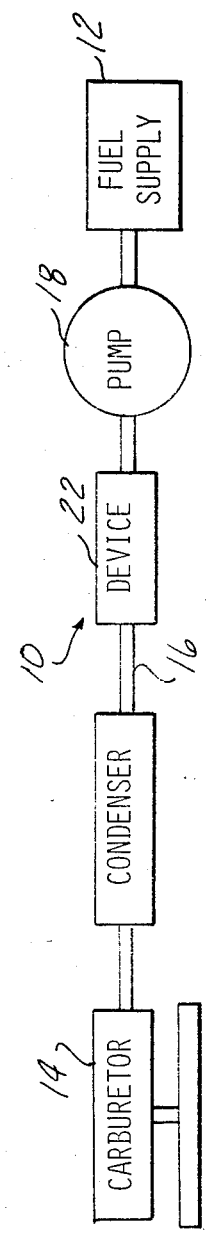

METHOD FOR INCREASING FUEL EFFICIENCY

BACKGROUND OF THE INVENTION

1. Field of the Invention

The present invention concerns combustible fluid fuels and methods of improving the burning efficiency thereof. More particularly, the present invention concerns vehicular fluid fuels and methods of increasing the combustion efficiency thereof. Even more particularly, the present invention concerns means and methods for treating combustible automotive fuels to enhance the fuel efficiency thereof.

2. Prior Art

In copending application Ser. No. 369,618, filed Apr. 19, 1982, the disclosure of which is hereby incorporated by reference, there is disclosed a method and device for increasing the fuel efficiency of an automotive vehicle. According to the disclosure thereof, the device has a bed comprising a plurality of metallized pellets through which the fuel passes. The disclosure further teaches that the fuel enters the device as a liquid and exits therefrom, likewise, as a liquid. This is achieved by maintaining the device at a temperature sufficiently low so as to maintain the fuel in the liquid state.

Although the device has been efficacious, it has now been discovered that the principles defined in the copending application have a wider application than the disposition of the device directly in the fuel line. It is to this discovery to which the present invention is directed.

Likewise, the present invention discloses an improved device and system for practicing the present invention with diesel fuels. Also, the present disclosure provides an improved system for increasing the fuel efficiency of a combustible fuel when disposed within an automotive vehicle.

SUMMARY OF THE INVENTION

In accordance with the present invention there is provided a method for increasing the burning or combustion efficiency of a combustible fluid fuel which, generally, comprises contacting the fuel with a metallic medium at a temperature sufficiently low so as not to alter the physical phase of the fluid.

The metallic medium, preferably, comprises a bed of metallized pellets wherein the metal is deposited on an inert substrate. Useful metals include any one of the noble metals, metal carbides, as well as mixtures thereof. The preferred metal is platinum.

In practicing the method hereof the metallic medium is disposed within any suitable device which can house the medium therewithin.

The device can be disposed directly in the fuel line of a vehicle intermediate the fuel tank and the carburetor. Alternately, the device can be associated with the fuel pump assembly of fuel stations, such as gasoline fuel filling pumps located at consumer fuel filling stations; on the nozzle of fuel hoses associated with fuel tankers, etc.

The device particularly adapted for diesel fuels comprises a pair of interconnected cannisters each containing a bed of metallized pellets disposed therewithin through which the fuel passes.

The diesel fuel device, as well as any other device, can be deployed directly in the fuel system of a vehicle intermediate the fuel supply tank and the carburetor or injectors.

For a more complete understanding of the present invention, reference is made to the following detailed description and accompanying drawing. In the drawing like reference characters refer to like parts throughout the several views, in which:

BRIEF DESCRIPTION OF THE DRAWING

FIG. 1 is a cross-sectional view of a device used in the practice of the present invention;

FIG. 2 is a cross-sectional view of a device particularly adapted for diesel fuels used in the practice of the present invention; and FIG. 3 depicts a fuel system for use directly in the fuel system of a automotive vehicle.

DESCRIPTION OF THE PREFERRED EMBODIMENTS

As hereinbefore noted, the present invention, generally, comprises a method for increasing the fuel efficiency of a combustible fluid fuel by bringing the fluid into contact with a metallic medium at a temperature sufficiently low so as to not alter the physical phase of the fluid, i.e. a gaseous fluid remains gaseous and a liquid fuel remains liquid.

The present invention is particularly adapted for use with liquid fuels such that the fuel when contacting the metallic medium remains liquid.

Although not wishing to be bound by any theory it appears that by contacting the fuel with the metallic medium, a certain amount of the metal becomes dissolved in the fuel and remains dissolved therein. This is distinct from prior art techniques wherein the metallic medium is used as a catalyst to alter the molecular structure of the fuels, such as altering the isomeric form of the fuel, etc., such catalytic methods being conducted at elevated temperatures whereby the fuel is vaporized and, then, subsequently re-condensed in its altered form. As noted, herein, the metal is dissolved in the fuel to enhance the efficiency thereof with the fuel remaining in a liquid phase.

The metallic medium can take on any useful form which will ensure intimate contact between the fuel and the metallic medium. Thus, the medium can comprise a mesh screen, pellets and the like, Preferably, the metallic medium is a metallized pellet(s). Optimally, the pellets comprise an inert substrate upon which is deposited the metal. Suitable inert substrates include silica, clays, alumina and the like.

The metals which are useful herein include, for example, the noble metals, metal carbides and the like, as well as mixtures thereof. Representative of the noble metals is, for example, palladium, nickel, platinum, rhenium, ruthenium and the like. Preferably, the metal is platinum.

The metal is deposited on the substrate by any suitable deposition technique. The pellets, as noted in the copending application, ordinarily have a mesh size ranging from about 1/32" to about ¼" in diameter. Where platinum is used as the metal, the purity of the platinum will range from about 0.1% to about 10%, in accordance with standard manufacturing techniques.

It should be noted that in practicing the present invention a mixture of pellets can be used, such as, some pellets being platinum pellets and some nickel pellets, and so forth.

The only criterion attached to the metal is that it be one which will enhance the combustion efficiency of the fuel, when dissolved therein.

However, preferably, all of the pellets are platinum pellets where the platinum is deposited on an aluminum substrate.

Ordinarily, the metallic medium is disposed in any suitable housing through which the fluid fuel may enter and exit prior to its combustion. One preferred device for contacting the fuel with the metallic medium is that shown in the copending application and which is depicted in FIG. 1 hereof. As shown in FIG. 1 the device 10 contemplated for use herein is that disclosed in the copending applications. The device 10, which when disposed in a fuel supply system of an automotive vehicle, includes a housing 22 disposed in fluid flow communication with the fuel supply conduit 16 between the fuel supply 12 and the carburetor 14. The device 10 is disposed intermediate the fuel pump 18 and the carburetor 14.

Generally, though, the hollow housing 22 is of substantially cylindrical configuration, and is formed of a metallic material, such as steel or the like. The housing may be formed of any other material which is not reactive with the fuel. Likewise, the housing may be heat conductive or insulative, as required. The housing 22 includes end or top and bottom wall members 25 and 26, respectively, secured to opposed ends thereof to completely seal the interior of the housing 22. Inlet and outlet ports 28 and 30, respectively, are formed in associated end wall. The inlet port 28 is preferably formed in the end top wall of the housing 22. A segment 32 of the fuel supply conduit 16 is secured to the port in fluid tight sealing relationship. The outlet port 30 is preferably formed, also, in the end wall member 25. Another segment 31 of the fuel supply conduit 16 is secured to the outlet port, as shown.

It is contemplated in the practice of the present invention that the interior of the housing can be heated to a temperature below the phase change temperature, if desired. The heating can be achieved either from the ambient, i.e., the engine compartment or the atmosphere, or from a heating element incorporated into the device. The heat source maintains the interior of the housing at a temperature ranging from about the ambient to a temperature of less than the vaporization temperature of a liquid fuel. Preferably, the temperature in the housing is maintained at a temperature of from about 25° C. to about 90° C. (This may vary, though, depending on the type of fuel.) Optimally, the fuel is heated in the housing to that degree necessary to ensure that the temperature flowing into the carburetor is at about 35° C. to 45° C. Hence in cold climates, and without a heat source incorporated within the device, the housing is heat conductive. Likewise, in extreme heat, the housing should demonstrate some insulative properties.

Preferably, however, the heat source is incorporated into the device. Where used, the internal heat source comprises a heating element 34.

The heating element 34 is securely mounted within the housing 22. Preferably, the heating element is in the form of a high watt density heater having an incoloy sheath material 35 disposed about the exterior thereof.

The heating element 34 is mounted to the housing 22 by any suitable means, such as external threads 36 formed adjacent the first end of the heating element 34 which threadingly engage an opening 38 formed in the housing 22. In this manner, the heating element 34 may be inserted and secured within the housing 22 as well as removed for repair or replacement. As shown in FIG. 2, a pair of electrical connections or wires extend outward from the heating element 34 and are adapted to be connected to a suitable power source, such as the automobile battery (not shown), or the like, for providing electrical current to the heating element 34.

A suitable temperature sensing means (not shown) may be mounted in the housing 22 for controlling the temperature generated by the heating element. Suitable electrical connecting means, (not shown), extend from the sensing unit to a conventional temperature control means so as to control the connection of electrical current to the heating element 34 to thereby maintain the temperature of the heating element 34 within the desired temperature range.

In FIG. 3 there is depicted an alternate form of the device of FIG. 2, but which is particularly adopted for use with diesel fuels and for gasoline heavy duty trucks. The device of FIG. 2 is constructed identically to that of FIG. 1 except that there are a pair of housings 122, 124 which are interconnected via a conduit 126.

As shown in FIG. 1, where the device of FIG. 2 or FIG. 3 is installed in an automotive vehicle, it is disposed directly in the fuel line intermediate the fuel pump and the carburetor or injectors, depending on the type of engine. It has now been found that the overflow return lines, as disclosed in the copending application, Ser. No. 369,618, are no longer necessary. In order to ensure against "vapor lock" in gasoline engines from occuring in the fuel line a condenser may be disposed intermediate the outlet port of the device and the fuel filter.

In all other respects the system of the copending application remains the same.

In order to practice the method hereof, however, the device need not be disposed directly into a vehicle fuel line system. Rather, the device can be installed proximate the nozzle of a fuel pump, such as is commonly found in "gasoline" stations; on the pump proximate the nozzle of fuel tanker trucks which are used to fill the large subterranean storage tanks located at "gasoline" stations, or directly at a refinery.

The method of the present invention can be used to enhance the fuel efficiency of gasoline, diesel fuels, kerosene, airplane fuels, LPG and similar fuels.

It has, also, recently been observed that by practicing the present invention, carbon deposits and the like in vehicle firing chamber(s) are minimized. Also, it should be noted that the metallic medium is durable and may last upwards of 100,000 vehicle miles, of course, depending on driving conditions. Fuel mileage increases, rated at miles per gallon, of upwards of five to ten percent in diesel and gasoline engines have been observed and reported by the practice of the present invention.

Having thus described the invention, what is claimed is:

1. A device for increasing fuel efficiency of a liquid fuel comprising:
   a first hollow housing, the housing having an inlet port for the liquid fuel;
   a first metallic medium disposed in the housing and which contacts the liquid fuel permitting minute amounts of the medium to dissolve therein;
   a second hollow housing, having an outlet port for issuing liquid fuel therefrom;

a second metallic medium disposed in the second housing and which contacts the liquid fuel permitting minute amounts of the medium to dissolve therein; and means for communicating between the first housing and second housing to permit the liquid fuel to flow from the first housing into the second housing, a source of heat for maintaining the temperature within the housings at a temperature ranging from about the ambient to about less than 100° C., and wherein the fuel entering the device and exiting the device is in a liquid phase.

2. The device of claim 1 wherein:
the first and second metallic media are identical.

3. The device of claim 2 wherein each metallic medium comprises a noble metal, or mixtures thereof.

4. The device of claim 3 wherein the metallic medium is selected from the group consisting of palladium, nickel, platinum, rhenium, ruthenium, and mixtures thereof.

5. The device of claim 4 wherein the metallic medium comprises a bed of metallized pellets, the metal being deposited on an inert substrate.

6. The device of claim 5 wherein the metal is platinum.

7. The device of claim 1 wherein the means for communicating comprises a conduit interconnecting the first housing and the second housing.

8. The device of claim 1 wherein the source for heat comprises:
means for heating the interior of each housing.

9. The device of claim 8 wherein:
the means for heating comprises a heating element associated with each housing, each element being mounted onto an associated housing.

* * * * *